United States Patent
Hooper

[15] 3,658,645
[45] Apr. 25, 1972

[54] NUCLEAR REACTORS

[72] Inventor: Alan Thomas Hooper, Weymouth, Dorset, England

[73] Assignee: United Kingdom Atomic Energy Authority, London, England

[22] Filed: Feb. 6, 1969

[21] Appl. No.: 796,950

[30] Foreign Application Priority Data

Feb. 7, 1968   Great Britain.....................6,170/68

[52] U.S. Cl..................................176/61, 176/59, 176/64, 176/65, 176/66
[51] Int. Cl................G21c 19/28, G21c 11/08, G21c 15/02
[58] Field of Search.....................176/59, 61, 66, 67, 68, 45, 176/64, 44, 87

[56] References Cited

UNITED STATES PATENTS

| | | |
|---|---|---|
| 3,322,643 | 5/1967 | Sprague et al............................176/59 |
| 3,275,521 | 9/1966 | Schluderberg et al...............176/59 X |
| 3,287,910 | 11/1966 | Silverstein............................176/45 X |
| 3,368,946 | 2/1968 | Jenssen..................................176/59 X |
| 3,389,054 | 6/1968 | Kovack....................................176/32 |
| 3,413,194 | 11/1968 | Kägi...........................................176/59 |
| 3,420,738 | 1/1969 | Grant...................................176/68 X |

FOREIGN PATENTS OR APPLICATIONS 1,041,177   10/1958   Germany................................176/59

*Primary Examiner*—Carl D. Quarforth
*Assistant Examiner*—Roger S. Gaither
*Attorney*—Larson, Taylor and Hinds

[57] ABSTRACT

In a nuclear reactor fuelled with porous fuel and having a fluid coolant, the coolant enters the core axially and traverses the porous fuel in a radial sense before leaving the core in a continuing radial direction. Pressure drop between inlet and outlet passages is reduced by avoiding the need for the coolant to pick up axial momentum on leaving the fuel.

6 Claims, 4 Drawing Figures

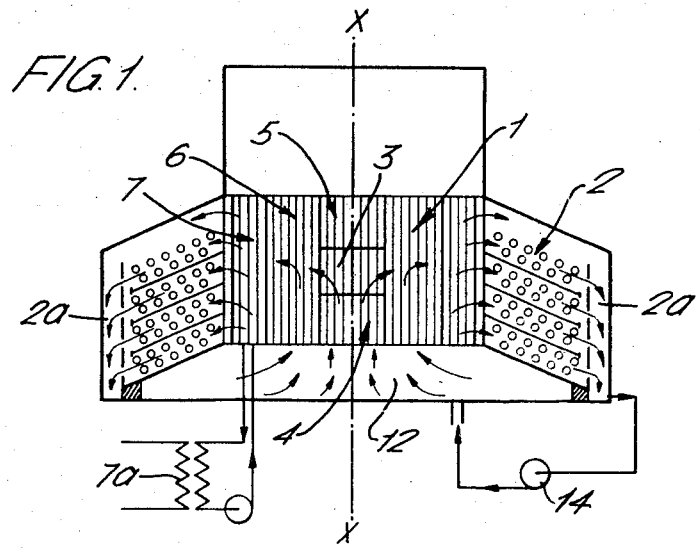
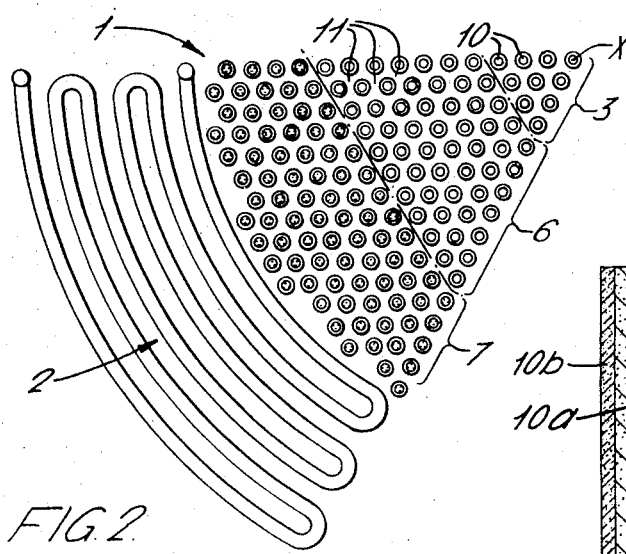
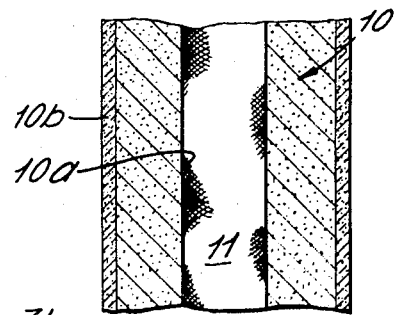
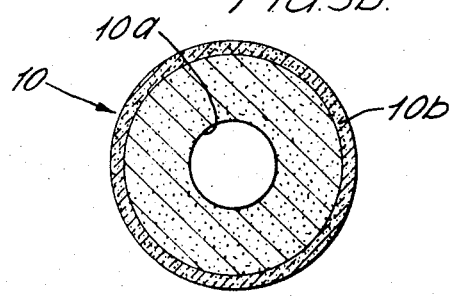

NUCLEAR REACTORS

BACKGROUND OF INVENTION

This invention relates to nuclear reactors employing fluid permeable fuel, herein referred to as porous fuel. Proposals have been made hitherto for the use of porous fuel in nuclear reactor cores with the aim of improving the heat transfer between fuel and coolant but, in general, these proposals were made for employing elongated porous fuel elements in reactor coolant channels of more or less conventional form, that is to say, within axially extending channels passing coolant in a generally axial direction with either coaxial or re-entrant flow.

SUMMARY OF INVENTION

According to the present invention in one aspect, there is provided a nuclear reactor having a core boundary, within which a critical mass of nuclear fuel-bearing material is supported in the form of porous walled, hollow, bodies spaced apart to define contiguous interspaces between them, coolant inlet and outlet means traversing the boundary of the core so as to leave at least one unobstructed end face of the core boundary for replacement of the fuel bodies, the coolant following a flow path within the core between the interspaces and the hollow interiors of said bodies which flow path traverses the porous walls.

Preferably the coolant flow path in the core is axial into the open end(s) of tubular fuel-bearing bodies and then radially with respect to the core axis through the tube wall and through the contiguous interspaces.

DESCRIPTION OF THE DRAWINGS

One form of gas cooled nuclear reactor embodying the invention will now be described with reference to the accompanying diagrammatic drawing in which:

FIG. 1 is an axial cross section through reactor core and its associated heat exchangers;

FIG. 2 shows a plan view of a sector of the reactor of FIG. 1;

FIGS. 3a and 3b show a typical tubular fuel element in respectively axial cross section and cross section normal to its axis.

DESCRIPTION OF THE PREFERRED EMBODIMENT

Referring to the accompanying drawing, the reactor core 1 is of right cylindrical shape with the axis X—X vertical, and this is circumscribed by an annular heat exchanger 2. Within the boundary of the core 1, a central fissile region 3, which contains fissile fuel sufficient for criticality, has axial blanket regions 4, 5 and an annular blanket region 6. Between the annular blanket region 6 and the heat exchanger 2, an annular neutron shield 7 is provided. The heat exchanger 2 is designed for radial flow and comprises segment-shaped pipe runs of serpentine tube each run providing successively superheater, boiler and economizer tube lengths. Provision may be made for reheat if necessary.

As shown also in FIG. 2, the regions 3 and 6 of the core 1 are occupied by fuel bearing tubes 10, supported, axes parallel, on a regular triangular lattice and spaced apart so as to leave intermediate contiguous spaces 11. The tubes 10 of regions 3, 4 and 5, 6 are all open at their lower ends and closed at the top. Each has a porous side wall so that coolant entering the bore of the tube at the bottom end is allowed to permeate through the wall into the intermediate spaces 11 and then to pass radially outwards towards, and through, the heat exchangers 2. An example of tube construction is shown in FIGS. 3a, 3b in which it will be seen that the tube has a porous wall formed of an inner skin 10a of stainless steel mesh and an outer skin 10b of porous ceramic material, the intermediate space being fitted with a porous mass of fission product retaining nuclear fuel particles. The fissile region 3, the upper and lower axial blanket regions 4, 5 and the radial blanket region 6 of the core are comprised of such tubes whose hollow walls are filled with porous masses of the appropriate nuclear fuel material. In the case of the outer annular blanket region 6, for example, the tubes have their hollow walls filled with porous fertile fuel material.

The precise disposition of the fertile material for the axial blanket regions 4, 5 and the fissile material for the region 3 is a matter of choice. The fuel material for fertile axial blankets 4, 5 and for the fissile core region may be packed into discrete axial lengths of the same tube or separate tubes may be employed in superposition for each kind of fuel. The outermost rows of tubes 7 which act as neutron shielding between the core and the heat exchanger 2 may be of any suitable construction which meets this end.

For example they may consist of steel and water, in which case the steel may be in the form of concentric tubes while the water would be maintained under pressure and pass in a closed circuit to the externally situated cooler 7a and back to the shield tubes. It would be necessary to provide a heat insulating layer, say of ceramic on the outside of the shield tubes to prevent excessive loading of the shield heat removing circuit and the degrading of the main coolant circuit temperature before it reaches the heat exchanger 2.

In operation the lower ends of the bores of the porous walled tubes in core regions 3, 4, 5, 6 communicate with gas coolant manifold 12 beneath the core to which gas is supplied by circulators as at 14, into the bores. Gas passes axially into the bores and percolates through the tube walls where it becomes heated and emerges into the intervening spaces 11. The gas flow in the spaces 11 is generally radial, and it then flows between the shield tubes 7 and over the bank of heat exchanger tubes 2 where the gas gives up its heat to a secondary coolant passed through the tubes 2. Thence the coolant passes through a gas plenum chamber 2a through the circulator back into inlet gas manifold 12.

The gas inlet and outlet means being inclined to one another a face 13 is left unobstructed and is available for refuelling and control gear etc. High temperature coolant is entirely contained within the core, blanket, shield, heat exchanger complex and only coolant at its bottom temperature can be contiguous with the walls of the reactor pressure vessel (not shown).

In the example described the tubes 10 are said to be disposed on a regular lattice and while this is preferable from the points of view of good physics performance and of fuel handling convenience, advantage may be gained by pitching the tube centres on an irregular or uneven lattice.

In a modified form of fuel bearing tube 10 the outer porous sleeve 10b obtains its porosity from one, or a number of holes through its wall.

In a further alternative the fuel bearing region of each or at least some of the tubes 10 is arranged in a number of coaxial annular regions held in position with annular interspaces between them.

I claim:

1. A nuclear reactor having a core comprising fuel bearing bodies in the form of a plurality of porous walled tubes spaced apart with their axes parallel, means for passing a coolant from one end of the core in parallel flow paths through the central bores of the tubes and then radially outwardly through the porous walls of the tubes, the arrangement being such that the outlet coolant flow path from the tube walls to the core periphery lies in a direction normal to the axes of the tubes with none of the coolant exiting through the other end of the core, and means for withdrawing coolant from the core in said direction.

2. A nuclear reactor as claimed in claim 1 including one or more annular rows of fertile fuel bearing fuel elements disposed about the periphery of the core.

3. A nuclear reactor as claimed in claim 1 in which a number of heat exchanger tubes carrying secondary coolant are disposed about the periphery of the core.

4. A nuclear reactor as claimed in claim 3 in which the out flow of coolant from between the heat exchanger tubes is directed back into the bores of the porous walled tubes via a flow path external to the core.

5. A nuclear reactor as claimed in claim 3 in which a number of water cooled shield tubes are disposed between the heat exchanger tubes and the periphery of the core.

6. A nuclear reactor comprising a right cylindrical core arranged with its axis vertical and having upper and lower end wall boundaries, the core being composed of a plurality of fuel bearing porous walled tubes arranged with axes parallel and parallel to that of the core, the tubes having open lower ends communicating with an inlet coolant plenum chamber adjacent the lower end wall boundary, a heat exchanger surrounding the core, means for passing a coolant in flow paths within the tube bores and radially outwardly through the porous walls of the tubes to the heat exchanger and thence back to the coolant inlet plenum with none of the coolant exiting through the upper end wall boundary, and a facility adjacent the upper end wall boundary for refuelling the core.

* * * * *